(12) United States Patent
Li

(10) Patent No.: US 9,296,301 B2
(45) Date of Patent: Mar. 29, 2016

(54) ENVIRONMENT-AWARE REGENERATIVE BRAKING ENERGY CALCULATION METHOD

(71) Applicant: Ford Global Technologies, LLC, Dearborn, MI (US)

(72) Inventor: Yonghua Li, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 64 days.

(21) Appl. No.: 13/684,520

(22) Filed: Nov. 24, 2012

(65) Prior Publication Data

US 2014/0149010 A1    May 29, 2014

(51) Int. Cl.
  *B60L 7/18* (2006.01)
  *B60L 15/20* (2006.01)

(52) U.S. Cl.
  CPC ............... *B60L 7/18* (2013.01); *B60L 15/2045* (2013.01); *B60L 2240/12* (2013.01); *B60L 2240/642* (2013.01); *B60L 2240/647* (2013.01); *B60L 2240/662* (2013.01); *B60L 2240/667* (2013.01); *B60L 2240/68* (2013.01); *B60L 2260/42* (2013.01); *Y02T 10/7283* (2013.01); *Y02T 10/7291* (2013.01); *Y02T 90/16* (2013.01)

(58) Field of Classification Search
  CPC ... B60L 15/2045; B60L 7/18; B60L 2240/12; B60L 2240/642; B60L 2240/647; B60L 2240/662; B60L 2240/667; B60L 2240/68
  See application file for complete search history.

(56) References Cited

U.S. PATENT DOCUMENTS

| 5,450,324 | A |   | 9/1995  | Cikanek |
|-----------|---|---|---------|---------|
| 5,913,917 | A | * | 6/1999  | Murphy ........................ 701/123 |
| 6,487,477 | B1| * | 11/2002 | Woestman et al. ............. 701/22 |
| 6,588,860 | B2|   | 7/2003  | Kosik et al. |
| 7,275,795 | B2|   | 10/2007 | Nishina et al. |
| 7,360,615 | B2| * | 4/2008  | Salman et al. ........... 180/65.265 |
| 7,958,958 | B2| * | 6/2011  | de la Torre Bueno ..... 180/65.29 |
| 8,024,082 | B2| * | 9/2011  | Richter et al. ................... 701/22 |
| 8,392,030 | B2| * | 3/2013  | Anderson et al. ............. 700/286 |
| 8,406,948 | B2| * | 3/2013  | Wang et al. ...................... 701/22 |
| 8,548,660 | B2| * | 10/2013 | Thai-Tang et al. .............. 701/22 |
| 8,612,077 | B2| * | 12/2013 | Phillips et al. ................... 701/22 |
| 2009/0115246 | A1 |   | 5/2009 | Yanagida et al. |
| 2010/0138142 | A1 | * | 6/2010 | Pease .......................... 701/123 |
| 2010/0299054 | A1 | * | 11/2010| Hennequet et al. ........... 701/123 |
| 2010/0312447 | A1 |   | 12/2010| Perkins |
| 2010/0320011 | A1 |   | 12/2010| Li et al. |
| 2011/0015819 | A1 | * | 1/2011 | Goto et al. ....................... 701/29 |
| 2011/0303498 | A1 | * | 12/2011| Crombez et al. ........... 188/106 P |
| 2012/0179347 | A1 | * | 7/2012 | Aldighieri et al. .............. 701/70 |
| 2012/0239283 | A1 | * | 9/2012 | Fasse et al. .................... 701/123 |
| 2013/0041552 | A1 | * | 2/2013 | MacNeille et al. .......... 701/32.9 |
| 2013/0274971 | A1 | * | 10/2013| Takahashi ....................... 701/22 |

OTHER PUBLICATIONS

"Regenerative braking system for a hybrid electric vehicle", American Control Conference, 2002, Proceedings of the 2002. pp. 3129-3134 vol. 4. ISSN: 0743-1619, by Cikanek, S.R.

* cited by examiner

*Primary Examiner* — Todd Melton
(74) *Attorney, Agent, or Firm* — David Kelley, Esq.; Tung & Associates

(57) ABSTRACT

A method of operating a vehicle includes implementing regenerative braking of the vehicle using discounted regeneration energy based on physical route conditions and base regenerative braking parameters for the vehicle.

20 Claims, 5 Drawing Sheets

US 9,296,301 B2

ENVIRONMENT-AWARE REGENERATIVE BRAKING ENERGY CALCULATION METHOD

FIELD

The disclosure generally relates to regenerative braking for vehicles. More particularly, the disclosure relates to an environment-aware regenerative braking energy calculation method in which dynamic information such as weather and road conditions are used to limit regenerative braking for traffic control purposes under different traction control events.

BACKGROUND

Regenerative braking is one of the enablers of hybrid vehicle technologies. It has been found that 15%~30% fuel economy improvements over a non-regenerative braking-capable vehicle can be achieved using regenerative braking. Trip information has been used to control HEV/PHEV/BEV and other types of hybrid vehicles in a most fuel-efficient fashion. Related to trip planning is a concept known as "energy to empty" for PHEV and BEVs, which approximately provides total energy available for propulsion purposes in a vehicle. This concept is closely-related to the "distance to empty" concept, which refers to the distance a vehicle can travel before all in-vehicle energy resources are exhausted to the lowest possible limits. Methods for "energy to empty" calculations generally include three parts: (1) energy from a thermal source (gas tank); (2) energy from an energy storage source (battery) based on initial state of charge of the battery; and (3) regenerative braking energy.

One of the most important applications related to "energy to empty" calculations is to find the most energy-efficient route for vehicle travel in trip planning. Several approaches to "energy to empty" calculations are known. These include a path-dependent approach for optimal energy management in HEV control in which considered inputs include static information such as road grade, segment average speed and traffic condition; on-board navigation system for EV and HEV management, in which ambient temperature information is used to determine end SOC value of HEV battery and other static information such as speed, driver behavior (via pattern recognition), grade information are considered inputs; and fuel-efficient driving area calculation and display, in which road types and grades such as uphill, downhill and "dangerous road" are considered inputs.

None of the conventional methods of calculating regenerative braking energy seems to have considered variations in regenerative braking energy recovery with fixed grade and traffic information along with dynamic information such as varying ambient temperatures and precipitation, road condition (roughness and surface mu information) together with related vehicle system controller regen-related calibration maps (i.e., how to discount regenerative braking in order to maintain traction control).

In reality, regenerative braking depends heavily on traction control needs and goes beyond grade or speed. Accordingly, calculation of regenerative braking energy based solely on static information such as grade, speed (as profiled), stop-sign and statistical traffic is insufficiently accurate.

Therefore, there is a need for a method which accurately calculates regenerative braking energy when a trip is planned in order to facilitate overall fuel economy improvement when dynamic information such as route ambient temperature information, precipitation information (forecast and past history) and/or road conditions (mu-identification) are available in advance.

SUMMARY

The disclosure is generally directed to a method of operating a vehicle. An illustrative embodiment of the method includes implementing regenerative braking of the vehicle using discounted regeneration energy based on physical route conditions and base regenerative braking parameters for the vehicle.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "front", "rear", "side", "interior" and "exterior" as used herein are intended for descriptive purposes only and are not necessarily intended to be construed in a limiting sense.

The disclosure is generally directed to an environment-aware regenerative braking energy calculation method in which dynamic information such as weather and road conditions are used to limit regenerative braking for traffic control purposes under different traction control events. The method is applicable to vehicles including HEV/PHEV/BEV with regenerative braking capability. The method utilizes known or available information such as vehicle route (including grade and speed profile), route ambient temperature trace, route precipitation trace (forecast and history), route road condition (surface mu, rough road) trace, regenerative braking discount map from vehicle system controller (with ambient temperature, precipitation information and/or road surface information as inputs) to achieve improved accuracy regenerative braking energy calculation.

Figure 1:
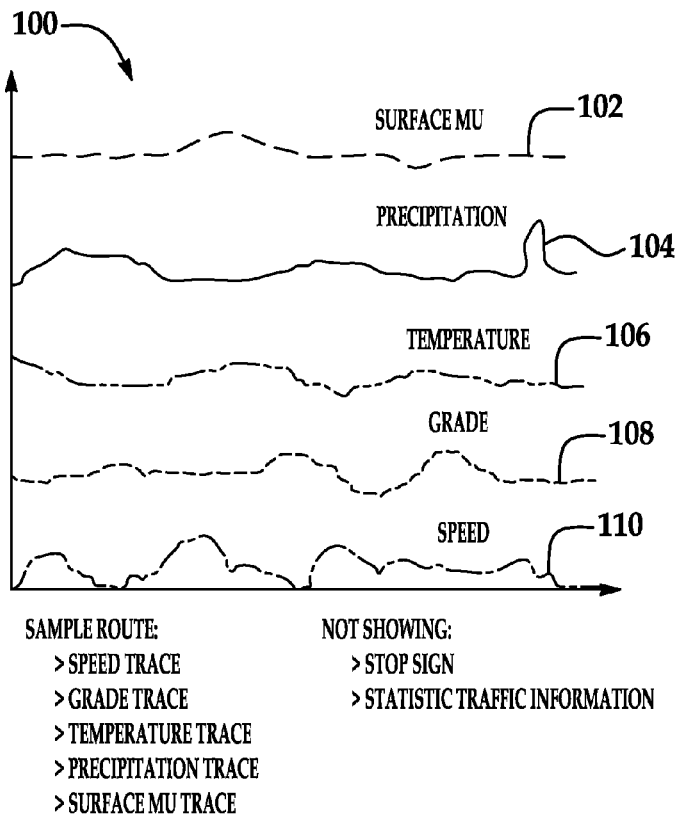
FIG. 1 is a graph which provides available information including static information and dynamic information for a given route used in implementation of the regenerative braking energy method.

Referring initially to FIG. 1, a graph 100 which illustrates available information including static information and dynamic information for a given route used in implementation of the regenerative braking energy method is shown. The information on the graph 100 includes static information such as surface mu 102, grade 108 and vehicle speed 110 as well as dynamic information such as precipitation 104 and temperature 106.

Figure 2:
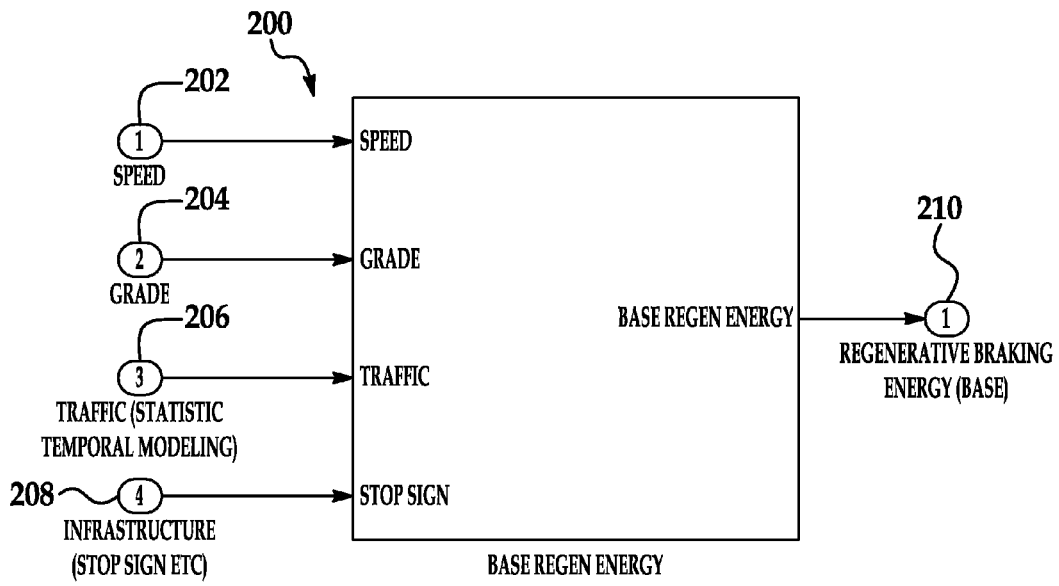
FIG. 2 is a diagram which illustrates calculation of base regenerative braking energy using speed, grade, traffic and infrastructure information according to partial implementation of the regenerative braking energy method.

Referring next to FIG. 2, a diagram 200 which illustrates calculation of energy to empty of a vehicle based on base regenerative braking energy using speed, grade, traffic and stop sign and other infrastructure information according to partial implementation of the regenerative braking energy method is shown. Accordingly, speed 202, grade 204, traffic 206 and infrastructure 208 are used to calculate base regenerative braking energy 210 using algorithms which are known by those skilled in the art. The traffic 206 may be determined using statistic temporal modeling.

The method of the disclosure calculates regenerative braking energy using various physical conditions of the route such as route ambient temperature and precipitation (forecast and history) as well as route surface mu information from government public service organizations (if available). Such information may be obtained from wireless internet access, GPS and other wireless communication means. In addition, regenerative braking related calibration from the vehicle system controller may be used. Such information should be readily available as the algorithm of the method may be part of the vehicle system controller.

Figure 3:
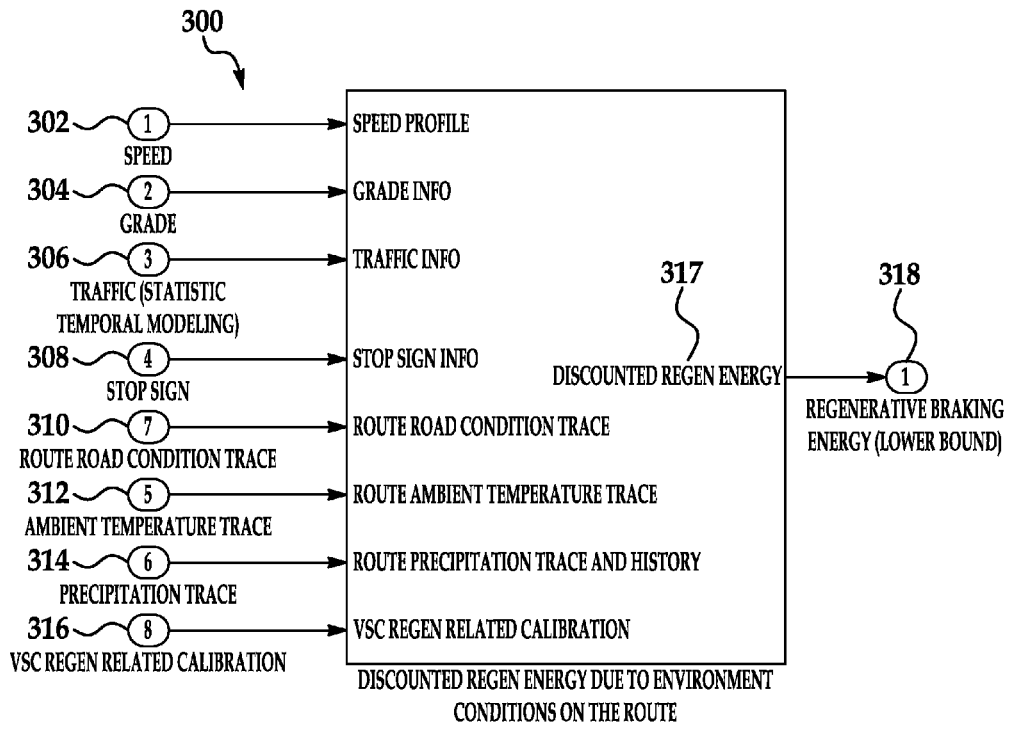
FIG. 3 is a diagram which illustrates improved calculation of regenerative braking energy with consideration of route ambient temperature and precipitation information according to implementation of the regenerative braking energy method.

Referring next to FIG. 3, a diagram 300 which illustrates improved calculation of regenerative braking energy with consideration of route ambient temperature and precipitation information according to implementation of the regenerative braking energy method is shown. Accordingly, base regenerative braking parameters including speed profile 302, grade information 304, traffic information 306 and stop sign information 308, as well as physical route conditions such as a route road condition trace 310, a route ambient temperature trace 312, a route precipitation trace and history 314 and VSC (Vehicle Stability Control) regeneration related calibration 316 are used to calculate a discounted regeneration energy 317 such as by using an algorithm which will be hereinafter described. The discounted regeneration energy 317 corresponds to a lower bound for the regenerative braking energy 318.

Figure 4:
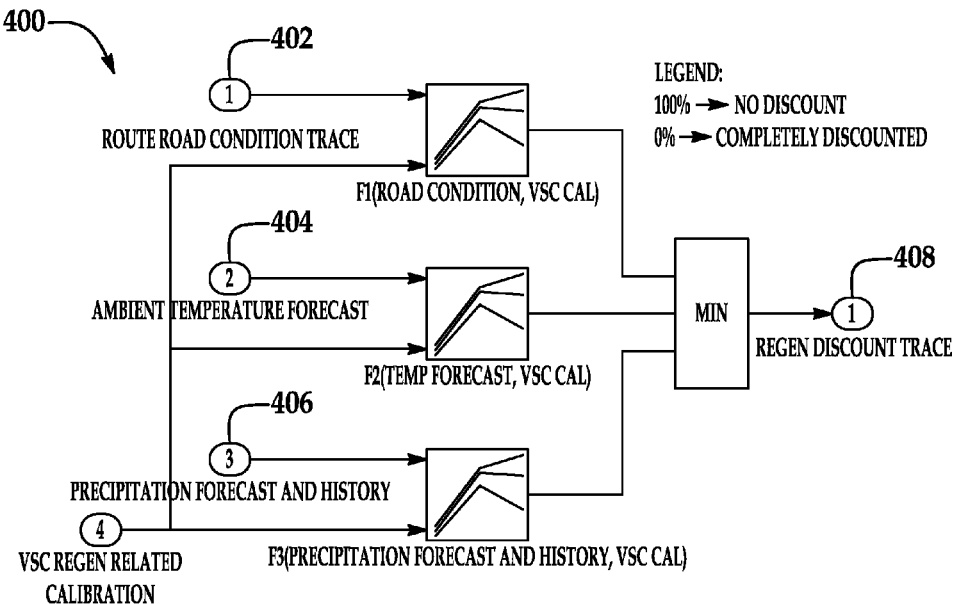
FIG. 4 is a discount trace calculation map in implementation of the regenerative braking energy method.

Referring next to FIG. 4, an exemplary discount trace calculation map 400 in implementation of the regenerative braking energy method is shown. A route road condition trace 402, an ambient temperature forecast 404 and a precipitation forecast and history 406 may be used to calculate a regen discount trace 408. The algorithm for the discount trace calculation 400 may be expressed as follows:

$$\text{Discount per road condition} = f1(\text{road condition}, VSC\ \text{cal}) \text{Discount per Ambient Temperature} = f2(\text{temp forecast}, VSC\ \text{cal}) \text{Discount per Precipitation Forecast and History} = f3(\text{precipitation forecast and history}, VSC\ \text{cal}) \text{Discount trace} = \min(f1, f2, f3)$$

Figure 5:
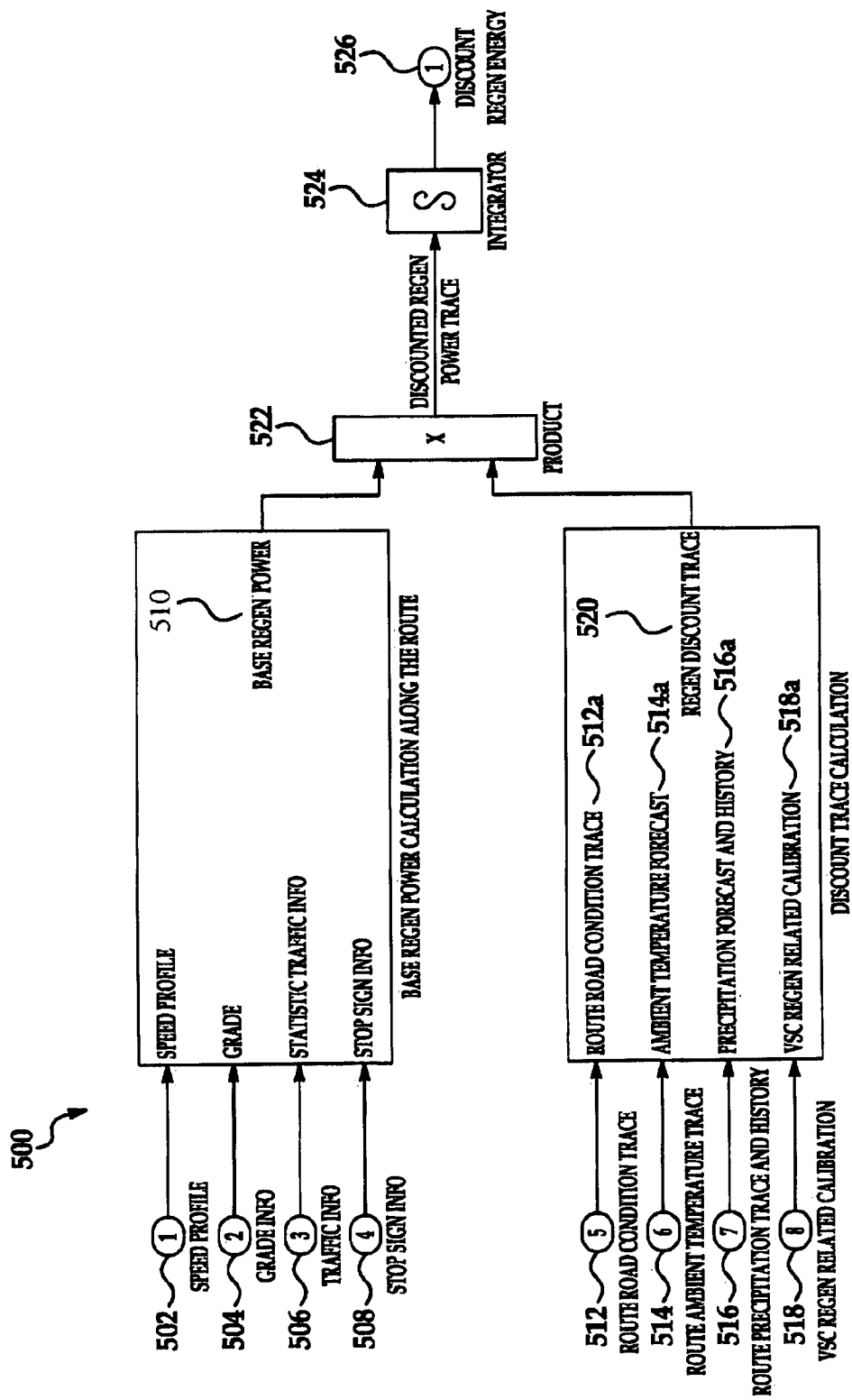
FIG. 5 is a block diagram which illustrates calculation of the discounted regenerative braking energy along a given vehicle route according to implementation of the regenerative braking energy method.

Referring next to FIG. 5, a block diagram 500 which illustrates calculation of the discounted regenerative braking energy along a given vehicle route according to implementation of the regenerative braking energy method is shown. Accordingly, speed profile 502, grade information 504, traffic information 506 and stop sign information 508 are used to calculate base regeneration power 510 from base regeneration energy along a proposed vehicle route. A route road condition trace 512, a route ambient temperature trace 514, a route precipitation trace and history 516 and a VSC regen-related calibration 518 are used to calculate a regeneration discount trace 520. A calculation product 522 is an element-wise product in which the base regeneration power 510 and the regeneration discount trace 520 are multiplied on an element-to-element basis to obtain an element-wise product, which may be integrated 524 to calculate the discount regeneration energy 526.

The static+dynamic information-based regenerative braking energy calculation of FIG. 5 leads to a more accurate estimation of regenerative braking energy as compared to base regenerative braking energy estimation alone. Moreover, the regenerative braking calculation method normally produces a regenerative braking energy that is generally smaller than the base regenerative braking energy estimation value.

Figure 6:
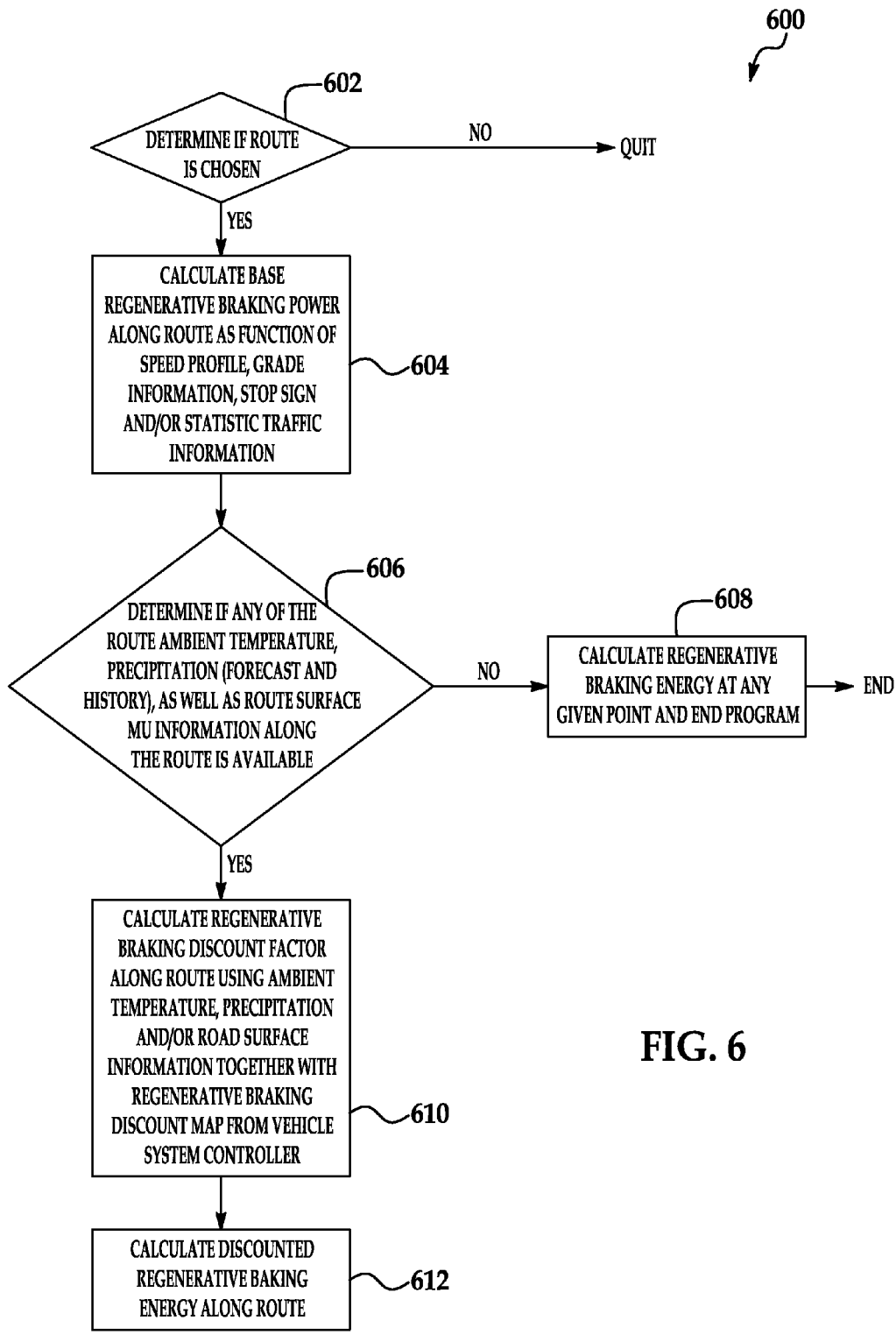
FIG. 6 is a flow diagram which illustrates an algorithm according to implementation of the regenerative braking energy method.

Referring next to FIG. 6, a flow diagram 600 which illustrates an algorithm according to implementation of the regenerative braking energy method is shown. The method facilitates calculation of regenerative braking energy based on route ambient temperature, precipitation and/or road condition information. In block 602, a determination is made as to whether a route has been chosen. If a route has not been chosen, the method quits. If a route has been chosen, then in block 604, the base (optimal) regenerative braking power along the route as a function of speed profile, grade information, stop sign and/or statistic traffic information is calculated. Next, in block 606, a determination is made as to whether any of the route ambient temperature, precipitation (forecast and history) and route surface mu information along the route is available. For ambient temperature, a trace (forecast, with reference to time/space depending on the route setting) may be required. For precipitation, past precipitation history (depending on calibration) and precipitation forecast along the route may be required. Road condition (surface mu trace) may similarly be considered. If any of the route ambient temperature, precipitation (forecast and history) and route surface mu information along the route are not available, the regenerative braking energy at any given point along the route may be calculated in block 608 typically according to the following equation and the method is ended:

$$E_{reg}\_\text{base} = \smallint_{time(route)} Preg\_\text{base}$$

If any of the route ambient temperature, precipitation (forecast and history) and route surface mu information along the route are available in block 606, the method proceeds to block 610, in which the regenerative braking discount factor along the route may be calculated using the ambient temperature, precipitation and/or road surface information together with the regenerative braking discount map from the vehicle system controller. The resulting discount trace may be denoted as DiscountFactorTrace.

In block 612, the discounted regenerative braking energy along the route is calculated according to the following equation:

$$Preg\_discounted = Preg\_base \bullet x \; DiscountFactorTrace$$

Where ●x denotes "element-wise product" in which these two traces are multiplied on an element-to-element basis and the end result is another trace.

$$Ereg\_discounted = \int_{time(route)} Pr\,eg\_discounted$$

In applications in which a surface mu feedback (i.e., a mu-identification based traction control) is used, the regenerative braking energy is normally higher than that which can be recovered using feedforward control but lower than the base regenerative braking energy. Therefore, a regenerative braking energy calculated based on feed-forward control will be a conservative estimation, which will lead to less optimistic calculation of real-world energy to empty value.

Figure 7:
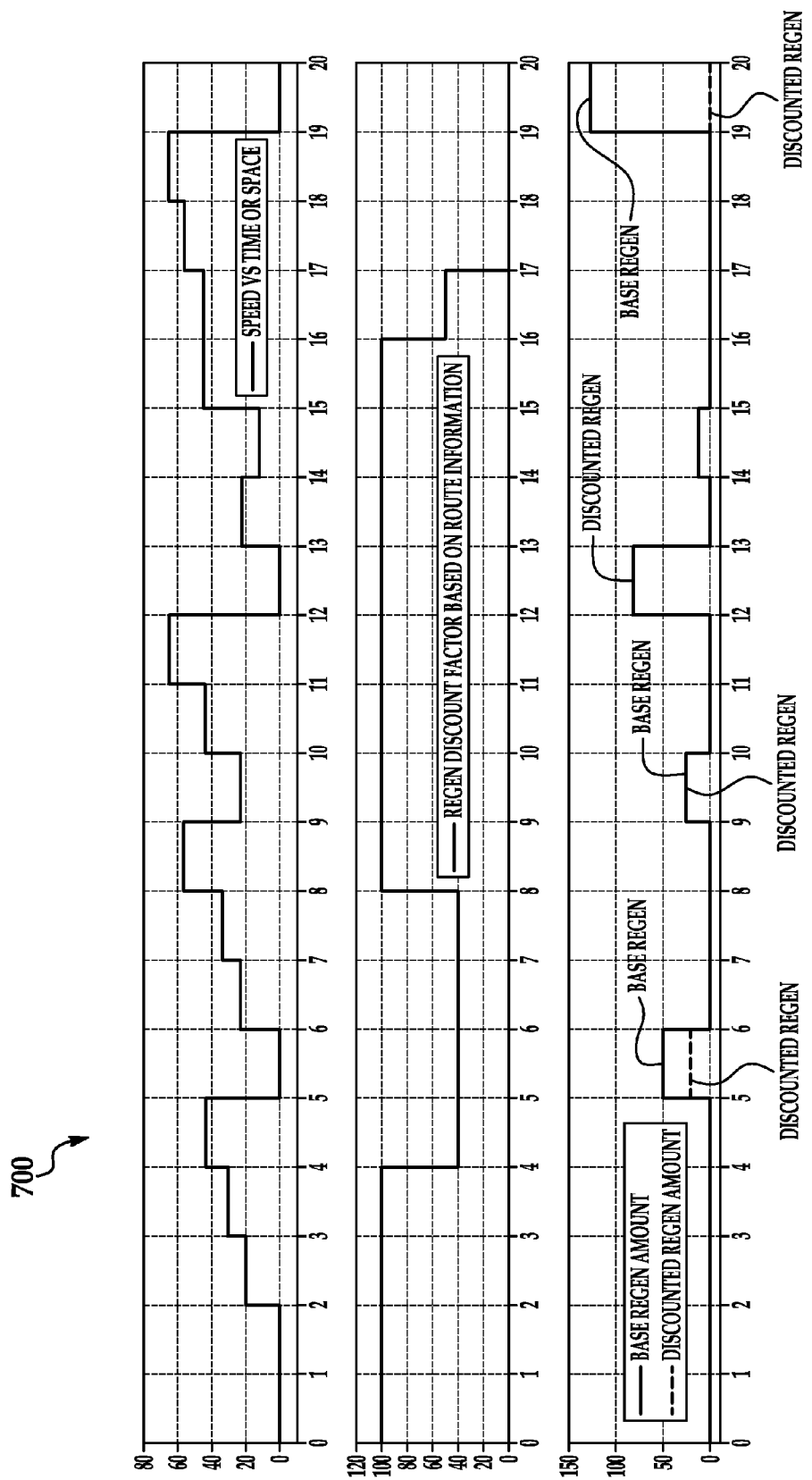
FIG. 7 is a graph which illustrates exemplary implementation of the regenerative braking energy method.

Referring next to FIG. 7, a graph 700 which illustrates exemplary implementation of the regenerative braking energy method is shown. A vehicle route is given as a time-speed curve (plot 1) of the graph 700. The discount factor is calculated based on some temperature, precipitation and/or road condition information and is given as plot 2 of the graph 700:

Discount=100%, if t∈[0,4]; 40%, if t∈[4,8]; 100%, if t∈[8,16]; 50%, if t∈[16,17]; 0%, if t∈[17,20]

The base regenerative braking energy is (simplified due to time unit is 1):

$$\bullet Ereg\_base = X1 + X2 + X3 + X4 + X5 = 50 + 25 + 80 + 10 + 125 = 290 (unit)$$

The discounted regenerative braking energy for the entire trip is much less than the original calculation. Hence, the overall energy to empty value for a given vehicle, for a given route, will be decreased as well with the additional dynamic information on route weather and road surface information, as well as vehicle system control related regenerative braking mapping.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of operating a vehicle, comprising:
   determining a proposed vehicle trip route;
   during planning the proposed vehicle trip route, calculating a total amount of discounted regenerative energy available for the proposed trip route based on static and dynamic physical conditions extending over the proposed trip route and base regenerative braking parameters for the vehicle, said calculation comprising estimating ire a total amount of discounted regenerative energy to be generated from regenerative braking over the entire proposed trip route, the discounted regenerative energy at any point along the proposed trip route calculated by discounting an amount of regenerative energy with respect to a base regenerative braking energy at any point along the proposed trip route, the base regenerative braking energy at any point along the proposed trip route determined from respective static physical conditions predicted to be present at any point along the route, the discounting determined from respective dynamic physical conditions predicted to be present at any point along the proposed trip route, the total amount of discounted regenerative energy estimated to be generated further comprising using regenerative calibration information for the vehicle, the estimation prior to travelling along the proposed trip route; and,
   implementing regenerative braking of the vehicle along said proposed trip route using the discounted regeneration energy.

2. The method of claim 1 wherein the base regenerative braking parameters are determined based on the static physical conditions to include at least one of speed profile, grade information, traffic information and stop sign information.

3. The method of claim 2 wherein a base regenerative braking energy includes at least one of the speed profile, grade information, traffic information and stop sign information and wherein the discounted regeneration energy includes the base regenerative braking energy.

4. The method of claim 3 wherein the dynamic physical route conditions include at least one of a route road condition trace, a route ambient temperature forecast trace, a route precipitation forecast and history trace and the regenerative calibration information for the vehicle comprises a vehicle stability control regeneration/traction control related calibration.

5. The method of claim 4 wherein calculating a total amount of discounted regenerative energy further includes determining a regen discount trace, said regen discount trace comprising a regenerative braking discount factor associated with said trip route, said regen discount trace determined using at least one of the dynamic physical route conditions and wherein the discounted regeneration energy includes the regen discount trace.

6. The method of claim 5 wherein calculating a total amount of discounted regeneration energy comprises multiplying the base regenerative braking energy by the regen discount trace on an element-to-element basis to produce an element-wise product.

7. The method of claim 6 wherein calculating a total amount of discounted regeneration energy comprises integration of the element-wise product.

8. A method of operating a vehicle, comprising:
   determining a proposed vehicle trip route;
   during planning the proposed vehicle trip route, calculating a total amount of discounted regenerative energy available for the proposed trip route based on a regen discount trace and a base regenerative braking energy based on base regenerative braking parameters, said regen discount trace comprising a regenerative braking discount factor associated with said proposed trip route,
   said calculation comprising estimating a total amount of discounted regenerative energy to be generated from regenerative braking over the entire proposed trip route, the total amount of discounted regenerative energy to be generated estimated by from the regenerative braking discount factor and the base regenerative braking energy, the base regenerative braking energy determined from respective static physical conditions predicted to be present at any point along the route, the regenerative braking discount factor determined from respective dynamic physical conditions predicted to be present at any point along the proposed trip route, the total amount of discounted regenerative energy estimated to be generated further comprising using regenerative calibration information for the vehicle, the estimation prior to travelling along the proposed trip route; and,
   implementing regenerative braking of the vehicle along said proposed trip route using said discounted regenerative energy.

9. The method of claim 8 wherein the base regenerative braking parameters are determined based on static physical conditions to include any combination of speed profile, grade information, traffic information and stop sign information.

10. The method of claim 8 wherein the dynamic physical route conditions include any combination of a route road condition trace, a route ambient temperature forecast trace, a route precipitation forecast and history trace and the regenerative calibration information for the vehicle comprises a vehicle stability control regeneration/traction control related calibration.

11. The method of claim 10 wherein the regen discount trace is determined based on the dynamic physical route conditions and wherein the discounted regeneration energy includes the regen discount trace.

12. The method of claim 8 wherein calculating a total amount of discounted regeneration energy comprises multiplication of the base regenerative braking energy by the regen discount trace on an element-to-element basis to produce an element-wise product.

13. The method of claim 12 wherein calculating the total amount of discounted regeneration energy comprises integration of the element-wise product.

14. A method of operating a vehicle, comprising:
planning a proposed route for vehicle travel;
during planning the proposed:
  obtaining base regenerative braking parameters for a vehicle, the base regenerative braking parameters determined from respective static physical route conditions predicted over the entire proposed route;
  calculating base regenerative braking energy for the vehicle along the entire proposed route using the base regenerative braking parameters;
  obtaining dynamic physical route conditions predicted to be present over the proposed route;
  calculating regenerative braking energy for the vehicle at any given point along the proposed route using the base regenerative braking parameters;
  obtaining a regenerative braking discount factor for the vehicle along the entire proposed route using the dynamic physical route conditions to generate a regenerative braking discount map from a vehicle system controller;
  calculating a total amount of discounted regenerative braking energy available for the vehicle along the entire proposed route using the base regenerative braking energy and the regenerative braking discount factor, said calculation comprising estimating the total amount of discounted regenerative energy to be generated from regenerative braking over the entire proposed route, the total amount of discounted regenerative energy estimated to be generated further comprising using regenerative calibration information for the vehicle, the estimation prior to travelling along the proposed trip route; and
implementing regenerative braking of the vehicle along said proposed route using the discounted regenerative braking energy.

15. The method of claim 14, wherein calculating regenerative braking energy at any given point along the proposed route comprises calculating a regenerative braking energy along the entire proposed route.

16. The method of claim 14 wherein obtaining base regenerative braking energy for the vehicle comprises calculating base regenerative braking energy as a function of grade information.

17. The method of claim 14 wherein obtaining base regenerative braking power comprises calculating base regenerative braking energy as a function of statistic traffic information.

18. The method of claim 14 wherein obtaining physical route conditions comprises obtaining one or more of route ambient temperature information, route precipitation information and route surface mu information along the route.

19. The method of claim 14 wherein calculating a total amount of discounted regenerative braking energy comprises obtaining an element-wise product wherein elements of the base regenerative braking energy are multiplied by elements of the regenerative braking discount factor.

20. The method of claim 19 further comprising integrating the element-wise product.

* * * * *